United States Patent [19]

H'mimy

[11] Patent Number: 5,912,876
[45] Date of Patent: Jun. 15, 1999

[54] METHOD AND APPARATUS FOR CHANNEL ESTIMATION

[75] Inventor: Hossam H. H'mimy, Dallas, Tex.

[73] Assignee: Ericsson, Inc., Research Triangle Park, N.C.

[21] Appl. No.: 08/784,193

[22] Filed: Jan. 15, 1997

[51] Int. Cl.⁶ .................................................. H04J 11/00
[52] U.S. Cl. ........................................................... 370/210
[58] Field of Search ..................................... 370/203, 206, 370/208, 210, 252, 482, 491; 375/224, 262, 265, 341; 371/43.6, 43.7

[56] References Cited

U.S. PATENT DOCUMENTS

| 5,005,188 | 4/1991 | Clark | 375/341 |
|---|---|---|---|
| 5,282,222 | 1/1994 | Fattouche | 375/200 |
| 5,732,068 | 3/1998 | Takahashi | 370/206 |
| 5,767,738 | 6/1998 | Brown | 329/304 |

FOREIGN PATENT DOCUMENTS 0 499 560 A1   1/1992   European Pat. Off. .

OTHER PUBLICATIONS

*Downlink Detection Schemes for MC–CDMA Systems in Indoor Environments* by Luciano Tomba and Witold A. Krzymien XP 000636076, IEICE Trans Commun., vol. E79–B, No. 9, Sep. 1996 pp. 1351–1360.
*Pilot–Based Channel Identification: Proposal for Semi–Blind Identification of Communication Channels* by Farhang–Boroujeny Electronics Letters, Jun. 22, 1995, vol. 31, No. 13 pp. 1044–1046.
*Orthogonal Multicarrier Techniques Applied to Direct Sequence Spread Spectrum CDMA Systems* by Antoine Chouly, Américo Brajal and Sabine Jourdan Laboratoires d'Electronique Phillps, 22 Avenue Descartes, 94453 Limeil–Brévannes Cedex, France pp. 1723–1728.
*Transmission of High Rate ATM Packets Over Indoor Radio Channels* by Ahmad Chini, Mohammed S. El–Tanany, and Samy A. Mahmoud XP 000586076, IEEE Journal on Selected Areas in Communications, vol. 14, No. 1, Apr. 1996 pp. 469–476.
Cimini, Leonard J., Member, "Analysis and Simulation of a Digital Mobile Channel Using Orthogonal Frequency Division Multiplexing", IEEE Transactions on Communications, vol. COM–33, No. 7, Jul. 1985.
Wu, Yiyan and Caron, Bernard, "Digital Television Terrestrial Broadcasting", IEEE Communications Magazine, May 1994.
Cacopardi, Saverio, Frescura, Fabrizio, Gatti, Fabrizio, Reali, Gianluca, "Channel Estimation and Tracking of an Indoor Orthogonal Multicarrier DS–CDMA System Using Measured Channel Delay Profiles", IEEE Communications Magazine, 1996.
Rinne, Jukka, "An Equalization Method Using Preliminary Decisions for Orthogonal Frequency Division Multiplexing Systems in Channels with Frequency Selective Fading", IEEE Communications Magazine, 1996.

*Primary Examiner*—Huy D. Vu
*Assistant Examiner*—Alexander Boakye
*Attorney, Agent, or Firm*—Jenkens & Gilchrist, P.C.

[57] ABSTRACT

A method for channel response estimation over a fast fading channel and signal estimation using a coded pilot is disclosed. A coded orthogonal frequency division modulated (OFDM) signal is generated including a main signal portion and a coded pilot signal portion. The coded OFDM signal is transmitted over a fading channel to a receiving unit wherein the received portion of the main signal is detected and an estimation is made of the frequency response of the fading channel using the coded pilot signal portion of the transmitted signal. The detected received main signal and the estimated channel frequency response are then used to estimate the signal. This determination may be based upon a channel inversion of the frequency response or new channel estimation combined with maximum likelihood sub-sequence estimation.

17 Claims, 2 Drawing Sheets

METHOD AND APPARATUS FOR CHANNEL ESTIMATION

BACKGROUND OF THE INVENTION

1. Technical Field of the Invention

The present invention relates to mobile telecommunication systems, and more particularly, to a method and apparatus for channel estimation within high data rate mobile communication systems.

2. Description of Related Art

The growing area of personal communication systems is providing individuals with personal terminals capable of supporting various services such as multimedia. These services require the use of increased bit rates due to the large amount of data required to be transferred. The use of increased bit rates generate problems in conventional single carrier systems due to intersymbol interference (ISI) and deep frequency selective fading problems.

One solution to these problems utilizes orthogonal frequency division multiplexing (OFDM) within the radio mobile environment to minimize the above-mentioned problems. Within OFDM, a signal is transmitted on multi orthogonal carriers having a bandwidth less than the coherence bandwidth in order to combat frequency selective fading of the transmitted signal. The ISI is mitigated by the use of guard intervals. OFDM systems are presently adopted in Europe for digital audio broadcasting and has been proposed for use in digital TV broadcasting systems. It is used also in the asymmetric digital subscriber lines (ADSL) to transmit high rate data.

Existing channel estimation methods are based on adaptive signal processing wherein the channels are assumed to vary slowly. The estimated channel parameters at a particular time depend on the received data and channel parameters at a previous time. In the case of fast varying channels, such as in high data rate mobile systems, these methods must be modified to reduce the estimation time. Existing modified channel estimators are complex in implementation and use time pilots or frequency pilots to estimate the impulse response or frequency response times. For deep fading channels, linear estimations will have poor performance. However, nonlinear estimators will provide better performance. Thus, a need exists for an improved method for channel estimation for orthogonal frequency division multiplexing systems in frequency selective fading mobile channel.

In OFDM, channel equalization is moved from the time domain to the frequency domain to enable the estimation of the channel frequency response. In time-invariant channels, commonly used equalization methods use zero forcing or least mean square (LMS) algorithms. The equalizer used in time-invariant channels is not necessarily suitable for the time variant channels such as the frequency selective fading channels which are characteristic of mobile communication channels. Several methods have been proposed for channel estimation and equalization for use with OFDM.

One method utilizes a periodic broadcasting of a block of train pulses as a time pilot. The time interval between each pulse is greater than the channel delay spread. However, the implementation is complex and requires additional circuitry for channel estimation and noise carrier suppression. Another method uses conventional LMS algorithms and additional tuning coefficients to speed up the manipulation of the equalizer. A modified method is used to compensate for the amplitude and phase errors common to all carriers in certain regions by using separate common carrier amplitude and phase estimators for some frequency plans. The equalizer structure for this method is also quite complex.

SUMMARY OF THE INVENTION

The present invention overcomes the foregoing and other problems with a method for improving channel estimation over a fading channel. The method initially performs quadrature amplitude modulation on a main signal consisting of a series of signal samples. The modulated samples are then coded using a first signal code. At the same time, a pilot signal, consisting of a series of 1's, is generated and coded with a second signal code that is orthogonal to the first signal code. The coded pilot signal and coded main signal are combined and processed by an inverse fast fourier transform into an OFDM signal prior to transmission over a fading channel to a receiver.

The received signal is processed by a fast fourier transform and applied to a set of matched filters consisting of a decoder and accumulator. One decoder and accumulator pair is responsible for detecting the received main signal within the OFDM signal. This comprises the portion of the OFDM signal coded using the first signal code. The received main signal is accumulated within the accumulator. The second accumulator and decoder pair decode the pilot signal portion of the OFDM signal coded by the orthogonal second signal code. This portion of the signal represents the pilot signal and an estimate of frequency response of the faded channel. Samples of the estimated frequency response are accumulated within the second accumulator.

An estimated main signal received by the receiver may then be calculated using the received main signal and the estimated frequency response of the faded channel. In a first embodiment, calculation of the estimated main signal involves use of the received main signal and the inverse of the estimated frequency response of the faded channel. In a second embodiment, the estimated main signal is determined from the received main signal, the estimated frequency response of the faded channel and a list of all possible transmitted signal subsequences. The list of possible sequences and the estimated frequency response of faded channels are utilized to calculate a matrix of all possible faded subsequences. This matrix in conjunction with the received main signal are used to calculate a metric that enables selection of the proper estimated main signal subsequence within the list of possible transmitted subsequences. The main signal sequence is the set of all estimated subsequences.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
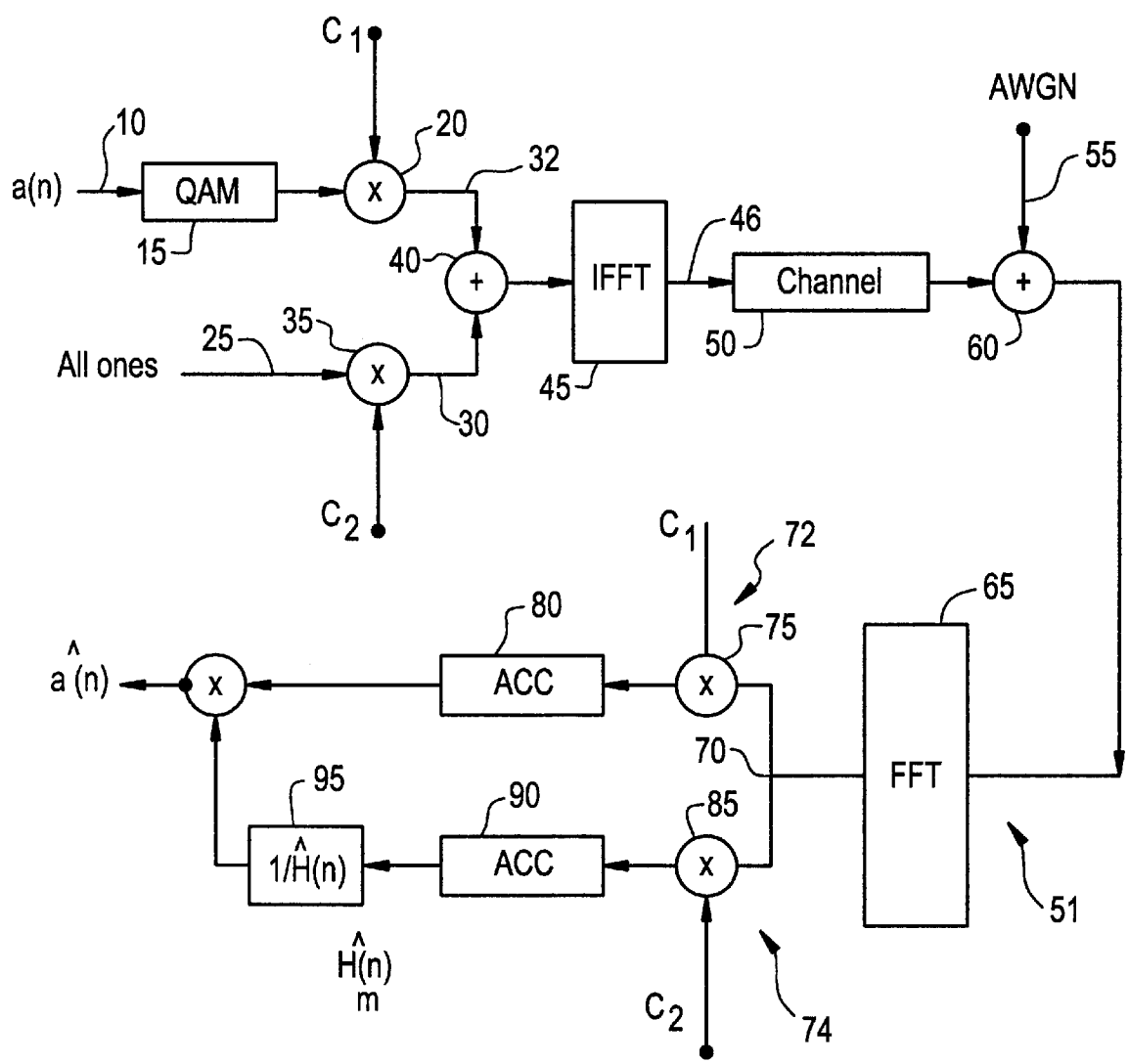
FIG. 1 is a block diagram of a first embodiment of the channel frequency response estimator of the present invention.

Referring now to the drawings, and more particularly to FIG. 1, there is illustrated an apparatus and method for estimating the channel frequency response for an orthogonal frequency division multiplexing (OFDM) systems having fast time varying channels. A main signal comprising block of N signal samples a(n) are provided to a quadrature amplitude modulator (QAM) 15. The modulated signal is multiplied (coded) at a mixer 20 with a first signal code $C_1$. Concurrently, a pilot signal 25 consisting of a series of 1's or some other known sequence is multiplied (coded) by a second signal code $C_2$ at mixer 35. The second signal code $C_2$ is orthogonal to the first signal code $C_1$.

The coded pilot signal 30 and coded signal samples 32 are combined (added) at combiner 40. The time domain signal created by a combination of the coded signal samples and the pilot code appears as:

$$x(n) = a(n)c_1 + c_2$$

The composite signal from mixer 40 is processed by an inverse fast fourier transform (IFFT) 45 to produce the OFDM composite signal. The IFFT signal 46 is transmitted over a radio link 50 to a receiving unit 51 at a remote location. The radio link or channel 50 comprises a fast varying fading channel. The channel is assumed to be a multi path frequency selective fading channel with an exponential power delay profile.

The inverse fast fourier transform of x(n) is X(k). Thus, the time domain signal transmitted over the radio link 50 appears as:

$$z(n) = X(n) * h(n) + n_{n1}$$

where: h(n) is the channel impulse response having H(K) as its frequency response;

* denotes convolution; and $n_{n1}$ is additive white gaussian noise (AWGN).

During the transmission of the signal, additive white gaussian noise (AWGN) 55 corrupts the transmitted signal over the radio link 50. This additional noise is indicated generally by mixer 60. It should be realized that no actual mixing unit is used to combine the AWGN 55 with the transmitted signal.

At the receiving unit 51 the received signal is processed by a fast fourier transform (FFT) 60 and then applied to two separate branches (72,74) at point 70. After the fast fourier transform, the signal appears as:

$$Z(n) = X(n)H(n) + n_{n2}$$

where: H(n) is the sample frequency response of H(K); and $n_{n2}$ is the processed gaussian noise.

A first branch 72 retrieves the received series of N distorted signal samples while the second branch 74 retrieves the pilot signal which includes an estimated frequency response of the faded channels within the received signal. Within branch 72 the signal is mixed (decoded) at mixer 75 with the first coded signal C1 to decode the C1 portion from the received signal. The decoded signal is then accumulated within accumulator 80. Accumulator 80 accumulates each of the signal samples encoded with the first signal code C1 and despreads the remainder of the signal.

The second branch 74 mixes (decodes) the fast fourier transformed signal at mixer 85 and detects the pilot signal portion coded with the second signal code C2. This detected signal is then accumulated within accumulator 90. The signal accumulated within accumulator 90 represents an estimation of the frequency response of the transmitted signal. The output of accumulator 90 comprises an estimation of n values of the channel frequency response at response time (m). Since the code signals are orthogonal, the output of the accumulator 90 will appear as:

$$\hat{H}(n) = \sum^T ((a(n)c_1 + c_2)H(n) + n_{n2})c_2$$

where: T is the number of code chips in the symbol interval and is equal to processing gain. Processing gain comprises the number of code channels per symbol interval.

$C_1$ and $C_2$ are orthogonal codes that satisfy:

$$\sum^T CiCj = \begin{matrix} O & i \neq j \\ T & i = j \end{matrix}$$

Therefore, the estimated sample frequency response provided by the accumulator 90 is given by:

$$\hat{H}(n) = H(n) + n_{n4}$$

where $n_{n4}$ comprises the processed gaussian noise.

The inverse of the estimated frequency response (channel inversion), taken at inverter 95, in conjunction with the received main signal is then used to determine the estimated channel signal. Thus, the output estimated signal is given by:

$$\hat{a}(n) = \frac{a(n)H(n) + n_{n4}}{H(n) + n_{n4}}$$

$$\hat{a}(n) = a(n)\frac{1}{1 + \frac{n_{n4}}{H(n)}} + \frac{\frac{n_{n4}}{H(n)}}{1 + \frac{n_{n4}}{H(n)}}$$

The advantage of this scheme, other than its simple implementation, is that the channel estimation is instantaneous because the sample signal and pilot signal are orthogonal code division multiplexed and distorted at the same time. The source of error in estimating the channel frequency response signal is the AWGN. In deep fading channels, i.e., H(n) large, this method fails.

Figure 2:
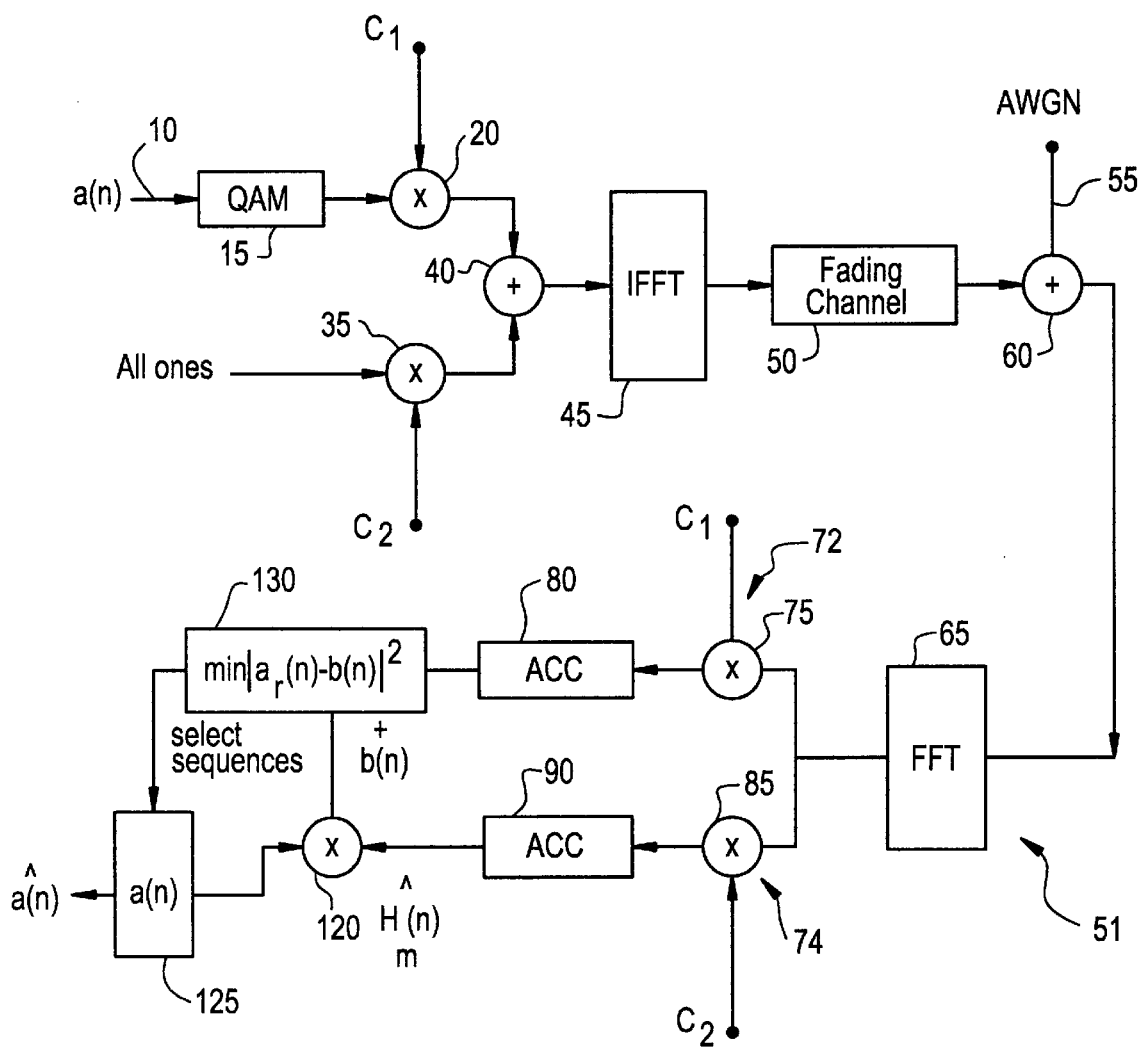
FIG. 2 is a block diagram of an alternative embodiment of a channel frequency response estimator.

Referring now to FIG. 2 there is illustrated a second embodiment of the invention. Similar reference numerals are used for the same components. As in the previous embodiment, a block of N signal samples a(n) are provided to a quadrature amplitude modulator (QAM) 15. The modulated samples are mixed (coded) at a mixer 20 with a first code signal $C_1$. The coded samples are added (multiplexed) together at adder 40 with a coded pilot signal consisting of a series of 1's (or other known sequence) multiplied (coded) by a second signal code $C_2$ at mixer 35. As before C, and $C_2$ are orthogonal to each other. This composite signal is processed by an inverse fast fourier transform 45. This provides an OFDM signal for transmission over a fading channel on radio link 50. Within the radio link 50 active white gaussian noise (AWGN) will become intermixed with the signal as shown generally by adder 60.

At the receiver unit 51, the received signal is applied to a fast fourier transform 65. The signal from the fast fourier transform is split at point 70 into first and second branches. The first branch 72 detects the actual received signal while the second branch 74 detects an estimation of the frequency response of the received signal. The received signal is multiplied (decoded) at mixer 75 by the code signal $C_1$ and passed through an accumulator 80 to accumulate all $C_1$ coded signals (the received sample signals) within the channel.

Likewise, received signal is multiplied by the second code signal $C_2$ at mixer 85, and accumulator 90 detects and accumulates the estimated frequency response of the faded channel. The accumulator 90 outputs a set of n values of channel frequency response time (m). The channel frequency response estimation is mixed at a mixer 120 with input from a memory 125 containing all possible subsequences of signals transmitted by the system to generate a matrix b(n) of all possible faded subsequences. The estimated main signal may then be determined using channel estimation with maximum likelihood subsequence estimation.

The coded pilot signal is utilized to estimate the channel frequency response at the same time the receive signal is detected within the first branch 72 of the receiver 51. This enables mitigation of the consequences of fast variations of frequency channels. Using the channel frequency response estimation $\hat{H}(n)$ from accumulator 90 and the set of all possible transmitted signal subsequences from memory 125, the matrix b(n) will be generated according to equation:

$$b(n) = a_i(n)\hat{H}(n); \; i \in (1, N/T)$$

where: N is the FFT order; and
T is the accumulator link.
We may further define b(n) as:

$$\begin{aligned} b(n) &= a_i(n)H(n) + a_i(n)n_{n3} \\ &= a_i(n)H(n) + n_{n5} \end{aligned}$$

where: $n_{n5}$ is a Gaussian noise that has the same variance as $n_{n3}$.

The accumulated output representing the received main signal $a_r(n)$ is subtracted from the matrix and squared at 130. The minimum of the absolute value of this result comprises a metric which is used to select the proper subsequence that is very close to the received signal at this time. The estimated received signal may then be selected based upon the minimum metric $(m_i)$.

The matrix $m_i$ used to select the proper output sequence from memory 125 is defined as:

$$M_i = |a_r(n) - b(n)|^2$$
$$= |(a_r(n) - a(n))H(n) + n_{n3} - n_{n4}|^2$$

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for improving channel estimation over a fast fading channel, comprising the steps of:
   generating a coded OFDM signal including a main signal portion coded using a first signal code and a pilot signal portion coded using a second signal code;
   transmitting the coded OFDM signal over a fading channel;
   detecting a received main signal within the coded OFDM signal;
   detecting a received pilot signal within the coded OFDM signal;
   estimating a frequency response of the fading channel carrying the transmitted coded OFDM signal from the detected pilot signal; and
   determining an estimated received signal from the detected received main signal and the estimated frequency response of the fading channel.

2. The method of claim 1, wherein the step of generating coded OFDM signal further includes the steps of:
   coding the main signal with the first signal code;
   coding the pilot signal, consisting of a known sequence, with the second signal code, wherein the second signal code is orthogonal to the first signal code; and
   combining the coded main signal and coded pilot signal to generate a coded composite signal.

3. The method of claim 2, wherein the step of transmitting further comprises the steps of:
   processing the coded composite signal according to an inverse fast fourier transform to generate the coded OFDM signal;
   transmitting the coded OFDM signal over the fading channel;
   receiving the transmitted coded OFDM signal; and
   processing the transmitted coded OFDM signal according to a fast fourier transform.

4. The method of claim 1 wherein the step of determining further comprises the steps of:
   inverting the estimated frequency response of the fading channel; and
   determining the estimated received signal from the received main signal and the inverted estimated frequency response.

5. The method of claim 1 wherein the step of determining further comprises the steps of:
   generating a matrix representing all possible faded subsequences from the frequency response of the fading channel and a set of all possible transmitted sequences; and
   determining the estimated received signal from the received main signal, the matrix and the set of all possible transmitted sequences.

6. The method of claim 1 wherein the step of detecting the received main signal further comprises the steps of:
   decoding the coded main signal portion of the coded OFDM signal; and
   accumulating a plurality of samples of the decoded main signal.

7. The method of claim 1 wherein the step of detecting the received pilot signal further comprises the steps of:
   decoding the coded pilot signal portion of the coded OFDM signal; and
   accumulating a plurality of samples of the decoded pilot signal representing the estimated frequency response.

8. A method for signal estimation over a fast, fading channel, comprising the steps of:
   generating a coded OFDM signal including a coded main signal portion and a coded pilot signal portion;
   transmitting the coded OFDM signal over a fading channel;
   detecting a received main signal within the coded OFDM signal;
   detecting the pilot signal within the coded OFDM signal;
   estimating a frequency response of the fading channel carrying the coded OFDM signal from the detected pilot signal;

inverting the estimated frequency response of the fading channel; and generating an estimated channel signal from the inverse of the estimated frequency response and the detected received main signal.

9. The method of claim 8 wherein the step of generating a coded OFDM signal further includes the step of:

coding the main signal with a first signal code;

coding the pilot signal with a second signal code, wherein the second signal code is orthogonal to the first signal code; and combining the coded main signal and coded pilot signal to generate a coded composite signal.

10. The method of claim 8 wherein the step of transmitting further comprises the steps of:

processing the coded composite signal according to an inverse fast fourier transform to generate the coded OFDM signal;

transmitting the coded OFDM signal over a fading channel; and processing the transmitted coded OFDM signal according to a fast fourier transform.

11. The method of claim 8 wherein the step of detecting the received main signal further comprises the steps of:

decoding the coded main signal portion of the coded OFDM signal; and accumulating a plurality of samples of the decoded main signal.

12. The method of claim 8 wherein the step of estimating the frequency response further comprises the steps of:

decoding the coded pilot signal portion of the coded OFDM signal;

accumulating a plurality of samples of the decoded pilot signal representing the estimated frequency response.

13. A method for improving channel signal estimation over a fast, deep fading channel, comprising the steps of:

generating a coded OFDM signal including a main signal portion coded using a first signal code and a pilot signal portion coded using a second signal code;

transmitting the coded OFDM signal over a fading channel;

detecting a received main signal from the coded OFDM signal;

detecting a received pilot signal within the coded OFDM signal;

estimating a frequency response of the fading channel carrying the transmitted coded OFDM signal from the detected pilot signal; generating a matrix representing all possible faded subsequences from the estimated frequency response and a list of all possible transmitted sequences:

creating a metric enabling selection of an estimated subsequence using the matrix and the received main signal; and selecting an estimated signal subsequence using the metric, the list of possible transmitted subsequences, and the estimated signal subsequences representing the estimated received signal.

14. The method of claim 13 wherein the step of generating a coded OFDM signal further includes the step of:

coding the main signal with the first signal code;

coding the pilot signal with the second signal code, wherein the second signal code is orthogonal to the first signal code; and combining the coded main signal and coded pilot signal to generate a coded composite signal.

15. The method of claim 14 wherein the step of transmitting further comprises the steps of:

processing the coded composite signal according to an inverse fast fourier transform to generate the coded OFDM signal;

transmitting the coded OFDM signal over a fading channel; and processing the transmitted coded OFDM signal according to a fast fourier transform.

16. The method of claim 13 wherein the step of detecting the received main signal further comprises the steps of:

decoding the coded main signal portion of the coded OFDM signal; and accumulating a plurality of samples of the decoded main signal.

17. The method of claim 13 wherein the step of detecting the pilot signal further comprises the steps of:

decoding the coded pilot signal portion of the coded OFDM signal;

accumulating a plurality of samples of the decoded pilot signal representing the estimated frequency response.

* * * * *